US010962166B1

(12) United States Patent
Liu

(10) Patent No.: US 10,962,166 B1
(45) Date of Patent: Mar. 30, 2021

(54) HEXAPOD POSE KNOWLEDGE IMPROVEMENT BY JOINT LOCATION CALIBRATION WITH INDIVIDUAL STRUT LENGTH DIFFERENTIAL MEASUREMENTS

(71) Applicant: United States of America as Represented by the Administator of NASA, Washington, DC (US)

(72) Inventor: Yong Liu, San Marino, CA (US)

(73) Assignee: United States of America as Represented by the Administrator of the National Aeronautics and Space Administration, Washington, DC (US)

( * ) Notice: Subject to any disclaimer, the term of this patent is extended or adjusted under 35 U.S.C. 154(b) by 320 days.

(21) Appl. No.: 16/052,960

(22) Filed: Aug. 2, 2018

Related U.S. Application Data

(60) Provisional application No. 62/543,536, filed on Aug. 10, 2017.

(51) Int. Cl.
| | |
|---|---|
| *G06F 19/00* | (2018.01) |
| *F16M 11/12* | (2006.01) |
| *G06N 3/04* | (2006.01) |
| *G05B 15/02* | (2006.01) |
| *G05D 3/20* | (2006.01) |
| *F16M 13/02* | (2006.01) |
| *G06N 20/00* | (2019.01) |

(52) U.S. Cl.
CPC ............ *F16M 11/121* (2013.01); *G05B 15/02* (2013.01); *G05D 3/20* (2013.01); *G06N 3/04* (2013.01); *F16M 13/02* (2013.01); *G06N 20/00* (2019.01)

(58) Field of Classification Search
CPC ........ F16M 11/121; F16M 13/02; G05D 3/20; G05B 15/02; G06N 3/04; G06N 20/00
See application file for complete search history.

(56) References Cited

U.S. PATENT DOCUMENTS

| 5,909,939 A * | 6/1999 | Fugmann ............... G01B 5/008 33/503 |
| 8,297,103 B2 * | 10/2012 | Valasek ................... B25J 9/1623 73/1.79 |
| 2016/0266346 A1 * | 9/2016 | Klaffert .................. G02B 7/183 |
| 2016/0298959 A1 * | 10/2016 | Jonas .................... G01B 21/042 |
| 2018/0209788 A1 * | 7/2018 | McMurtry ............ G01B 21/047 |
| 2019/0145748 A1 * | 5/2019 | Angood ................. B25J 9/0012 33/503 |

OTHER PUBLICATIONS

Design, Simulation, and Control of a Hexapod Robot in Simscape Multibody ; IntechOpen p. 1 of 17 (Year: 2016).*

* cited by examiner

*Primary Examiner* — Harry Y Oh
*Assistant Examiner* — Sohana Tanju Khayer

(57) ABSTRACT

Calibration of a hexapod structure includes measuring a head pose of the hexapod structure relative to a base of the hexapod structure. Calibration of the hexapod structure also includes for each strut, independently increasing a length of each strut by a predefined amount from an original length and repeating the measuring of the head pose relative to the base. Calibration of the hexapod structure further includes for each strut, independently decreasing a length of each strut by a predefined amount from the original length and repeating the measuring of the head pose relative to the base. Additionally, calibration of the hexapod structure includes moving each strut back to the original length, and estimating joint errors for each strut prior to calibrating of the hexapod structure.

20 Claims, 5 Drawing Sheets

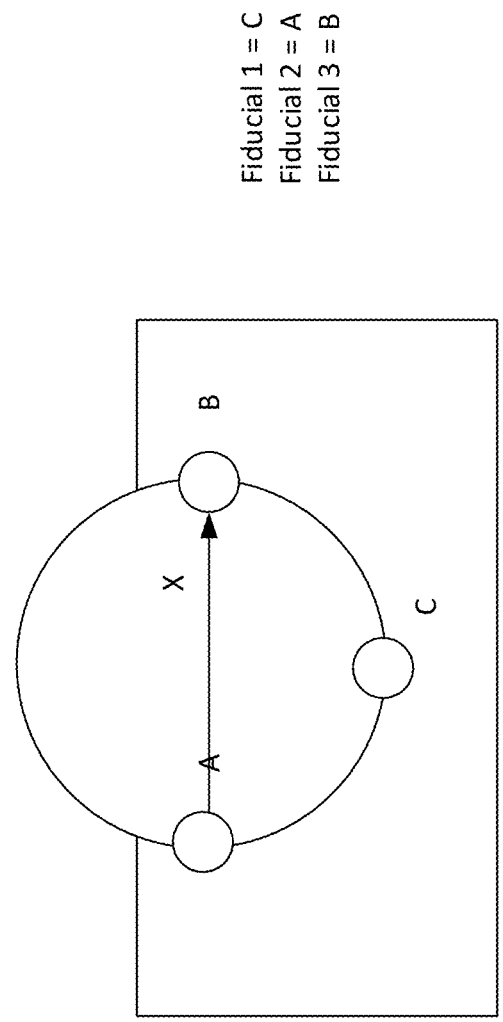

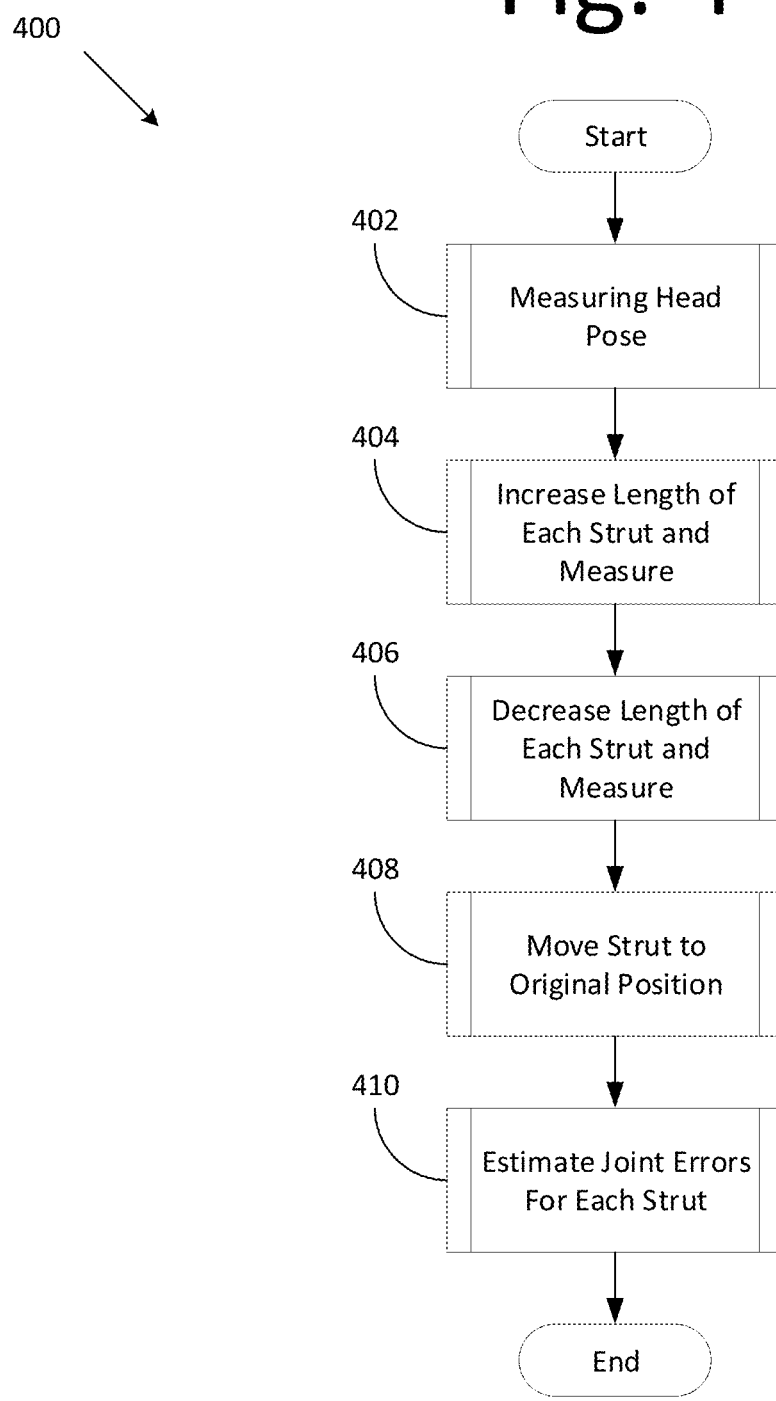

HEXAPOD POSE KNOWLEDGE IMPROVEMENT BY JOINT LOCATION CALIBRATION WITH INDIVIDUAL STRUT LENGTH DIFFERENTIAL MEASUREMENTS

ORIGIN OF THE INVENTION AND CROSS-REFERENCE TO RELATED APPLICATIONS

Embodiments of the present invention described herein were made in the performance of work under NASA contract NNNC12AA01C and are subject to the provisions of Public Law #96-517 (35 U.S.C. § 202) in which the Contractor has elected not to retain title.

The present application derives priority from U.S. provisional application Ser. No. 62/543,536 filed on Aug. 10, 2017.

FIELD

The present invention relates to hexapod structures, and more specifically, with calibrating hexapod structures with an application to a PIXL instrument.

BACKGROUND

PIXL instrument on a vehicle employs a hexapod structure to provide six (6) degrees of freedom (DOF) maneuverability. The knowledge of the exact locations of the top and bottom joints of all six struts is critical in determining the real-time pose of the PIXL instrument to support PIXL science mission. Direct measurements of those joints locations however are not possible or difficult.

Thus, a new calibration approach for hexapod structures with applications to the vehicle employing a hexapod structure may be beneficial.

SUMMARY

Certain embodiments of the present invention may provide solutions to the problems and needs in the art that have not yet been fully identified, appreciated, or solved by current spectrometer technologies. For example, some embodiments generally pertain to a calibration approach for hexapod structures with application to PIXL.

In an embodiment, a process for calibrating a hexapod structure includes measuring a head pose of the hexapod structure relative to a base of the hexapod structure, and for each strut, independently increasing a length of each strut by a predefined amount from an original length and repeating the measuring of the head pose relative to the base. The process also includes, for each strut, independently decreasing a length of each strut by a predefined amount from the original length and repeating the measuring of the head pose relative to the base. The process further includes moving each strut back to the original length, and estimating joint errors for each strut prior to calibrating of the hexapod structure. In an alternative (and more generic) embodiment, the process includes measuring N (e.g., N>3) number of poses with each strut at N number of different lengths and forming N−1 number of length differences for each strut.

In another embodiment, a computer program is embodied on a non-transitory computer readable medium. The computer program is configured to cause at least one processor to execute measuring a head pose of the hexapod structure relative to a base of the hexapod structure, and for each strut, independently increasing a length of each strut by a predefined amount from an original length and repeating the measuring of the head pose relative to the base. The computer program is further configured to cause at least one processor to execute, for each strut, independently decreasing a length of each strut by a predefined amount from the original length and repeating the measuring of the head pose relative to the base. The computer program is also configured to cause at least one processor to execute moving each strut back to the original length, and estimating joint errors for each strut prior to calibrating of the hexapod structure.

In yet another embodiment, an apparatus includes memory comprising a set of instructions, and at least one processor. The set of instructions with the at least one processor is configured to cause the apparatus to execute measuring a head pose of the hexapod structure relative to a base of the hexapod structure, and for each strut, independently increasing a length of each strut by a predefined amount from an original length and repeating the measuring of the head pose relative to the base. The set of instructions with the at least one processor is further configured to cause the apparatus to execute, for each strut, independently decreasing a length of each strut by a predefined amount from the original length and repeating the measuring of the head pose relative to the base. The set of instructions with the at least one processor is also configured to cause the apparatus to execute moving each strut back to the original length, and estimating joint errors for each strut prior to calibrating of the hexapod structure.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIG. 3 is a diagram illustrating survey fiducials A, B, C, according to an embodiment of the present invention.

FIG. 4 is a flow diagram illustrating a process for executing calibration of a hexapod structure, according to an embodiment of the present invention.

DETAILED DESCRIPTION OF THE EMBODIMENTS

The PIXL instrument does not have joint sensors to directly measure the joint locations or strut articulations. Thus, a calibration approach with manageable amount of measurement data is beneficial.

For the joint location calibration problem, there are a total of 36 joint location error terms that can be estimated. Simultaneously estimating all 36 error terms with proper measurements and with minimal influence of other contributing errors, such as length scale factor, is challenging. Thus, some embodiments estimate the joint locations of each strut individually without the influence of errors associated with the other five struts, and sequentially estimate the joint locations of all six struts. This way, the size of the problem is reduced, and the convergence of the estimation is more attainable.

Some embodiments use a surveyed hexapod head 6-DOF pose relative to the base, coupled with at least two strut length differentials from a minimal of three distinctive length of an individual strut while keeping the lengths of the other five struts fixed. An estimation problem is formulated and solved based on the measurements of the combined head pose and strut length differentials. Once all joint locations are estimated, real-time hexapod head pose can be accurately predicted.

In some further embodiments, other errors affecting the pose accuracy (e.g., strut length scale factor) are separately estimated with very minimal coupling to the joint location errors.

To achieve enough observability of the unknowns, three distinctive hexapod head poses called three calibration configurations are used. At each configuration, the following steps are performed.

First, the head pose relative to the base is measured using survey tools (e.g., laser tracker). Second, strut #1 length is increased from the original length by a chosen amount with precise knowledge of the length increase and the head pose relative to the base is measured. Third, strut #1 length is decreased from the original length by a chosen amount with precise knowledge of the length decrease and the head pose relative to the base is measured. Fourth, strut #1 is moved back to its original length defined by calibration configuration #1.

It should be appreciated that the above-mentioned steps should be repeated for each of the other five struts one-by-one under calibration configuration #1. Finally, the above-mentioned steps should be repeated for calibration configuration #2 and #3.

Once the pose data and strut length differentials data are recorded, an algorithm estimates the joint errors.

Hexapod Calibration

Figure 1:
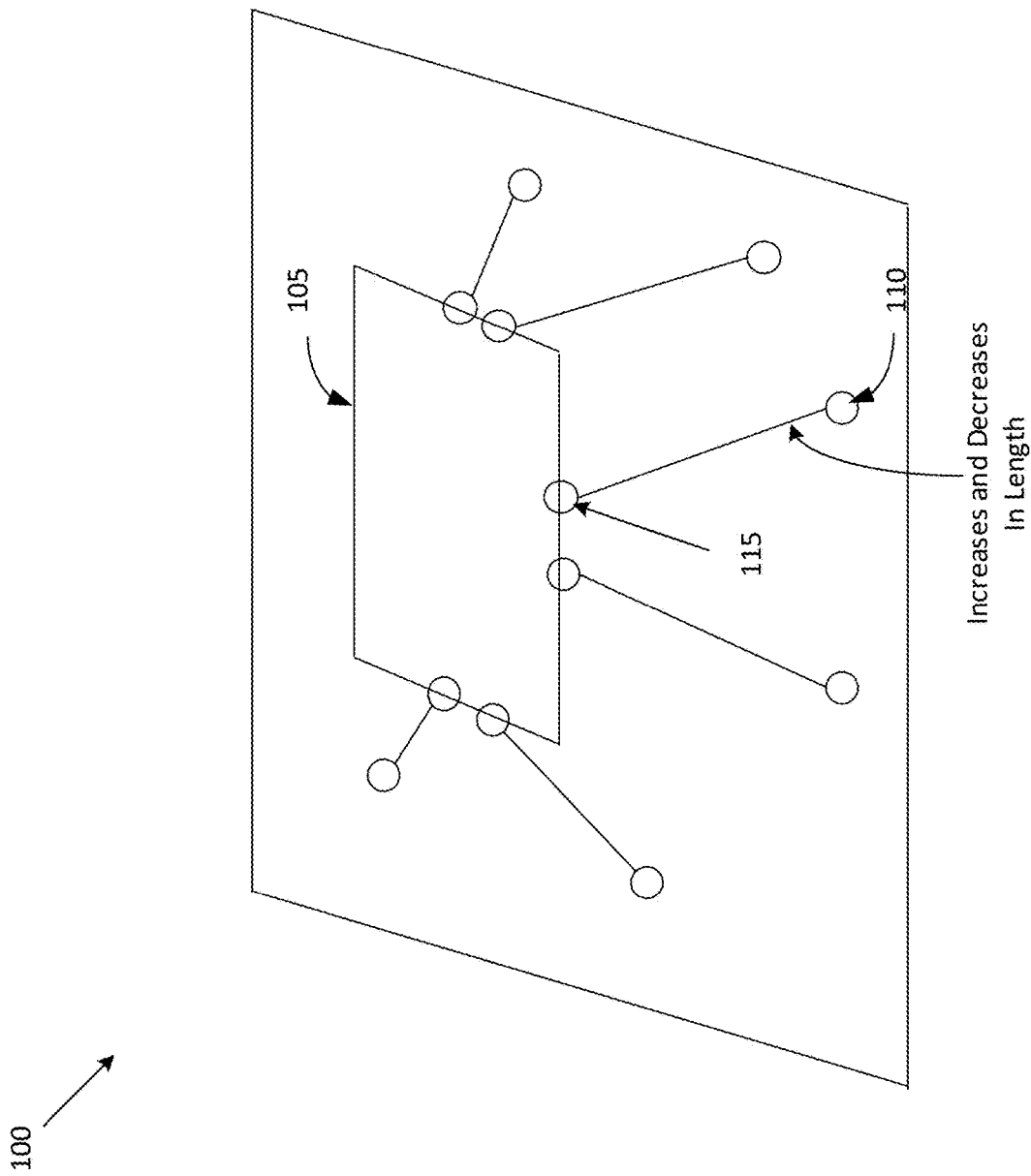
FIG. 1 is an illustration of the PIXL hexapod, according to an embodiment of the present invention.

For the purpose of the hexapod calibration, it is important to know the general geometric information of the structure. FIG. 1 is an illustration of the PIXL hexapod 100, according to an embodiment of the present invention. In some embodiments, PIXL hexapod 100 includes a sensor head 105 and a plurality of struts 110. Although two struts are shown in the drawings, one of ordinary skill in the art would appreciate that PIXL hexapod 100 includes six (6) struts. Some embodiment may pertain to the position estimation of ball joints 115, which is critical for determining 6 DOF target locations.

In this embodiment, PIXL hexapod 100 has 6 active struts 110 and 12 ball joints 115, which each ball joint 115 having three coordinates. In total, 36 estimations are performed.

Coordinate Frames on Base and Head

Figure 2:
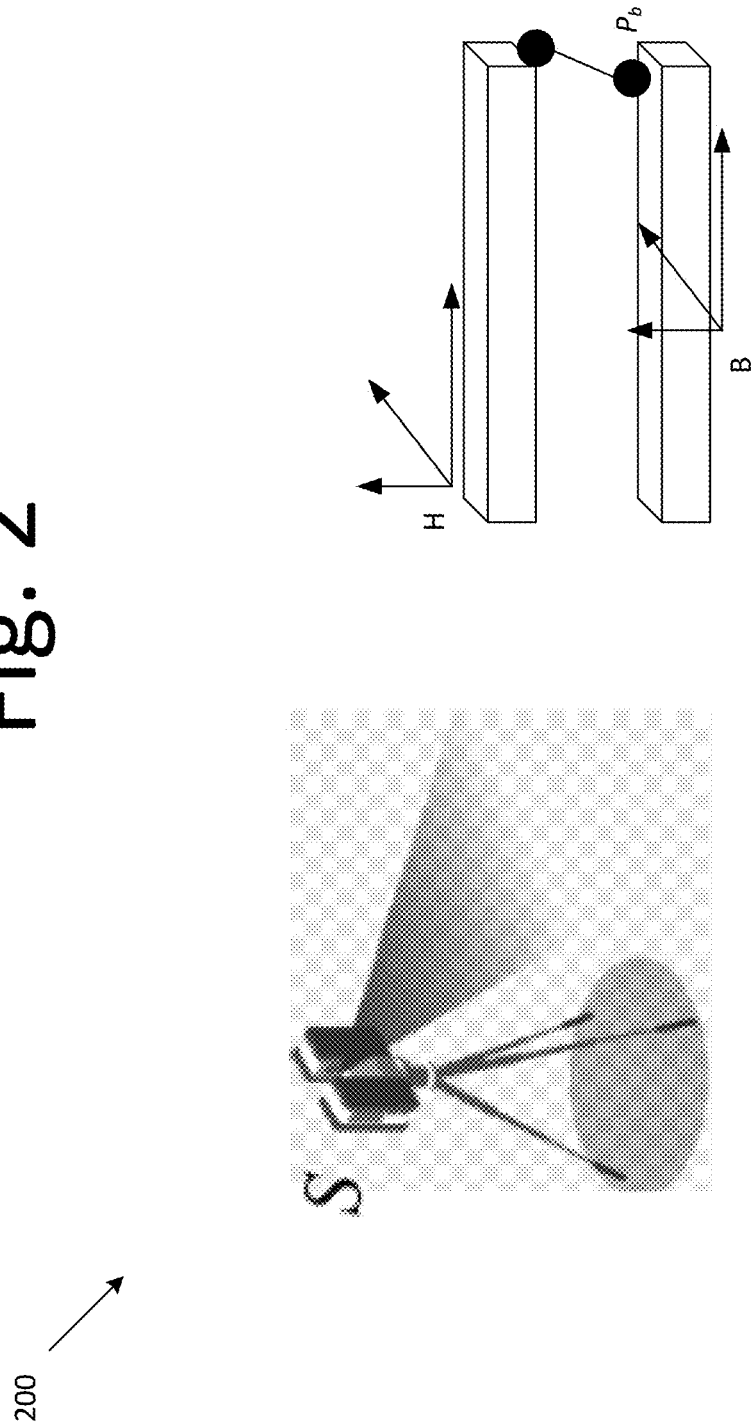
FIG. 2 is an illustration of a survey equipment and head and base frames of the PIXL hexapod, according to an embodiment of the present invention.
Figure 5A:
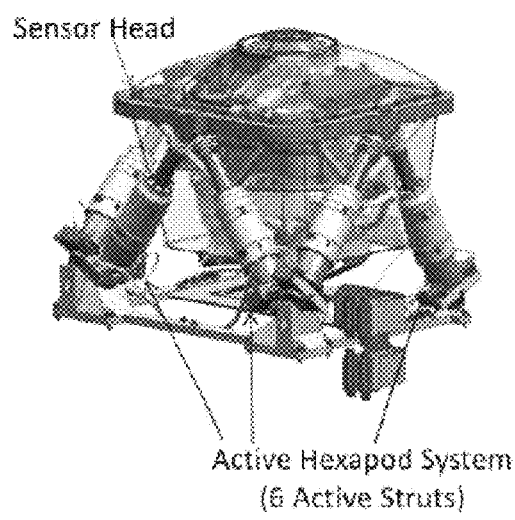
FIG. 5a is an illustration of the PIXL hexapod, according to an embodiment of the present invention.
Figure 5B:
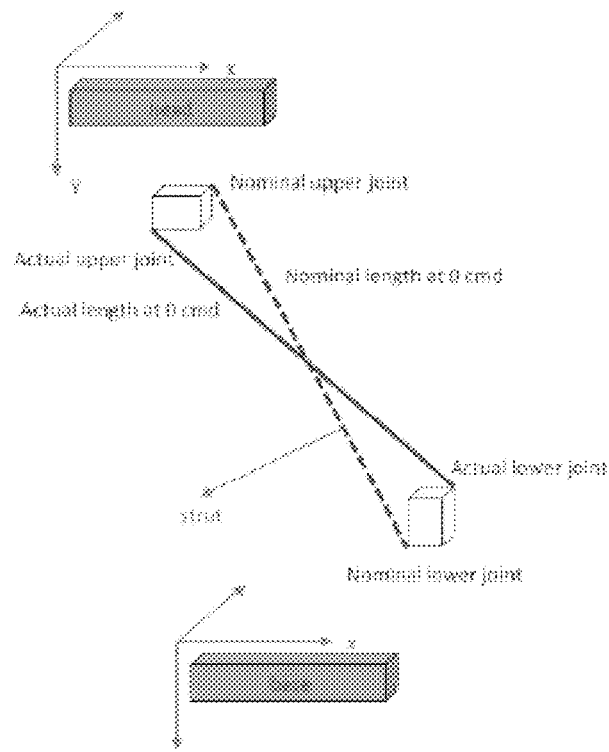
FIG. 5b is an illustration of the PIXL hexapod configuration, according to an embodiment of the present invention.

For a single strut, the joint geometry and joint errors are shown in FIG. 2. In this embodiment, it is assumed that there are at least 3 fiducials on base (B) and 3 fiducials on head (H) of the hexapod. Surveyed positions of the fiducials from a laser tracker or survey equipment (S) is used to form the head and base coordinate frames, respectively.

In terms of the position vector expressed in the head (H) and base (B) frames, the error model is written as follows:

$$^H p_a = \begin{bmatrix} p_{ax} \\ p_{ay} \\ p_{az} \end{bmatrix} + \begin{bmatrix} \delta p_{ax} \\ \delta p_{ay} \\ \delta p_{az} \end{bmatrix}, \quad \text{Equation (1)}$$

$$^B p_b = \begin{bmatrix} p_{bx} \\ p_{by} \\ p_{bz} \end{bmatrix} + \begin{bmatrix} \delta p_{bx} \\ \delta p_{by} \\ \delta p_{bz} \end{bmatrix}$$

The head (H) and base (B) frame relationship is established using a survey tool measurement, as shown below.

$$C_{HB} = C_{HS} C_{BS}{}' \quad \text{Equation (2)}$$

$$B_{r_{B \to H}} = C_{BS}(s_{r_{S \to H}} - s_{r_{S \to B}}) \quad \text{Equation (3)}$$

where the survey tool frame is S. With the survey results, the head joint location vector may be mapped to the base frame as follows:

$$^B p_a = B_{r_{B \to H}} + C_{BH}[^H p_a] \quad \text{Equation (4)}$$

With joint locations expressed in the same frame, the strut length with error terms can be expressed as $$l = \sqrt{(^B p_a - {}^B p_b)^T ({}^B p_a - {}^B p_b)} + \delta l + l \delta s \quad \text{Equation (5)}$$

where $l\delta s$ is the error contribution from the strut length scale factor uncertainty.

Calibration Problem Size Consideration

In some embodiment, a large number of error variables need to be estimated. For example, a total of 12 joints have 36 position errors and there are an additional 6 strut length scale factor uncertainties, with a total number of unknowns at 42. In general, simultaneously, estimating a large number of error terms, especially when the observability is limited, may pose challenges.

In an embodiment, the designated head join locations are given in a CAD mechanical frame as follows:

$$^M p_a = \begin{bmatrix} ^M a_x \\ ^M a_y \\ ^M a_z \end{bmatrix}, \quad \text{Equation (6)}$$

$$^M p_b = \begin{bmatrix} ^M b_x \\ ^M b_y \\ ^M b_z \end{bmatrix}$$

where i equals 1 . . . 6.

and the j-th fiducial for the hexapod head is at $$^M f_j = \begin{bmatrix} ^M f_{jx} \\ ^M f_{jy} \\ ^M f_{jz} \end{bmatrix} \quad \text{Equation (7)}$$

FIG. 3 is a diagram 300 illustrating survey fiducials A, B, C, according to an embodiment of the present invention. In this embodiment, one may use different techniques to define a coordinate frame based on points A, B, C on a structure. For example, assume fiducial C is selected as the origin of the frame. In this embodiment, the x-axis is defined as the unit vector pointing from fiducial A to fiducial B and the y-axis is defined as the unit vector passing fiducial C and perpendicular to the x-axis, with the z-axis forming a right-hand triad.

With the axes defined, the mapping from the mechanical frame to the fiducials defined frame is given by $$C_{MF} = [x_M y_M z_M] \quad \text{Equation (8)}$$

where $x_M, y_M, z_M$ are axes coordinates in a given M frame.

It should be noted that a similar fiducial frame may be defined for both the head (H) and base (B). With these definitions, the strut head joint locations may be expressed in the fiducial frame as (with the fiducial defined frame for the head designed as H fame and the fiducial defined frame for the base designated as B frame)

$$H_{P_a} = C_{MH}'(M_{P_a} - M_{P_{HC}}) \quad \text{Equation (9)}$$

where $M_{P_{HC}}$ is the center coordinates of fiducial frame given in a CAD frame. Similarly, the strut base joint locations may be expressed in the base fiducial frame and may be calculated as $$B_{P_b} = C_{MB}'(M_{P_b} - M_{P_{BC}}) \quad \text{Equation (10)}$$

where $M_{P_{BC}}$ is the center of fiducial for the base (B) given in a CAD frame.

With this, the strut head and base joint locations initial knowledge may be given in the head and base fiducial defined frames.

Next, the procedure for conducting a survey of the hexapod is described below.

The survey measurements of fiducials on base and head can be used to generate the head orientation and location knowledge relative to the base frame using the following procedure.

First, using the head fiducial measurements, the head fiducial defined frame is computed to the survey frame direction cosine matrix as $$C_{SH} = [s_{x_H} s_{y_H} s_{z_H}] \quad \text{Equation (11)}$$

One example of constructing the fiducial frame can be:

$$\begin{cases} {}^s x_H = \dfrac{{}^s p_B - {}^s p_A}{\|{}^M p_B - {}^M p_A\|} \\ {}^s z_H = \dfrac{({}^s p_B - {}^s p_A) \times ({}^s p_C - {}^s p_A)}{\|({}^s p_B - {}^s p_A) \times ({}^s p_C - {}^s p_A)\|} \\ {}^s y_H = ({}^s z_H) \times ({}^s x_H) \end{cases} \quad \text{Equation (12)}$$

are the fiducial defined frame axes expressed in the survey frame.

Similarly, the same procedure can be used to compute the base fiducial defined frame to survey frame DCM as $$C_{SB} = [s_{x_B} s_{y_B} s_{z}] \quad \text{Equation (13)}$$

The head pose relative to the base may now be characterized by the displacement of the head fiducial frame origin from the base fiducial frame origin and the DCM between the two frames:

$$\begin{cases} {}^B r_{B \to H} = C_{SB}' \cdot [{}^s p_{H0} - {}^s p_{B0}] \\ C_{BH} = C_{SB}' C_{SH} \end{cases} \quad \text{Equation (14)}$$

where $s_{P_{H0}}$ and $s_{P_{B0}}$ are the origins of the head and base fiducial frames, respectively.

Estimate Joint Errors

Upper and lower joint location errors may be estimated using the difference between the predicted pose and the measured pose in a procedure described below.

First, the strut length scale factor uncertainty is assumed to be much smaller relative to the joint location errors. The initial knowledge of the joint locations in the head and base frames, respectively, are assumed.

$$\text{Initial Knowledge} \to \begin{cases} {}^B \bar{p}_b \\ {}^H \bar{p}_a \end{cases} \quad \text{Equation (15)}$$

With this, the initial estimates of the head joint location can be used, coupled with the measured pose to predict the upper joint location in the base frame:

$$\text{Measured Pose} \to \begin{bmatrix} {}^B r_{B \to H} \\ C_{BH} \end{bmatrix} \to {}^B \bar{p}_a = {}^B r_{B \to H} + C_{BH} [{}^H \bar{p}_a] \quad \text{Equation (16)}$$

With the predicted upper joint location in the base frame, the predicted strut length can be computed from the upper and lower joint positions in the base frame as follows:

$$l_i = \sqrt{({}^B \bar{p}_{bi} - {}^B \bar{p}_{ai})^T ({}^B \bar{p}_{bi} - {}^B \bar{p}_{ai})} = \\ l_i({}^B r_{B \to H}, C_{BH}, {}^H \bar{p}_{ai}, {}^B \bar{p}_{bi}) \quad \text{Equation (17)}$$

where i equals to 1, 2, 3, 4, 5, 6.

Usually, if the measured strut length is available, the difference between the measured length and the predicted length can be used to estimate the errors. In this embodiment, however, the truth strut length is not easily measureable. To resolve this issue, the strut length differentials are used, instead of the strut length itself. This is because that even though the absolute strut length is not available, the delta strut length, when commanded the strut to move from one position to another, can be precisely measured. In fact, the step command count of the strut motor driving software gives a very precise measurement of the delta strut length assuming there is no step slip.

The predicted strut length differentials can be obtained as follows.

For the strut being calibrated, the strut is moved from its nominal position to a position further up and to a position further down so we have three strut positions, denoted as "0", "U" and "D". Let's assume that the strut being calibrated is Strut #1. In this example, the three poses are measured, with Strut #1 being at the three positions, and the strut lengths are computed as the functions of three poses as follows:

$$\begin{cases} l_{10} = l_{10}({}^B r_{B \to H,0}, C_{BH,0}, {}^H \bar{p}_{ai}, {}^B \bar{p}_{bi}) \\ l_{1u} = l_{1u}({}^B r_{B \to H,u}, C_{BH,u}, {}^H \bar{p}_{ai}, {}^B \bar{p}_{bi}) \\ l_{1d} = l_{1d}({}^B r_{B \to H,d}, C_{BH}, {}^H \bar{p}_{ai}, {}^B \bar{p}_{bi}) \end{cases} \quad \text{Equation (18)}$$

Next, two predicted length differences are formed:

$$\begin{cases} \bar{\delta}_u = \bar{l}_{1u} - \bar{l}_{10} = \bar{\delta}_u(S_{meas}, {}^H\bar{p}_{ai}, {}^B\bar{p}_{bi}) \\ \bar{\delta}_d = \bar{l}_{1d} - \bar{l}_{10} = \bar{\delta}_d(S_{meas}, {}^H\bar{p}_{ai}, {}^B\bar{p}_{bi}) \end{cases} \quad \text{Equation (19)}$$

If the measured strut length deltas are denoted as $$\begin{bmatrix} \delta_u \\ \delta_d \end{bmatrix} \quad \text{Equation (20)}$$

The following innovation between the measured and predicted delta strut lengths are formed as $$\begin{cases} \Delta_u = \delta_u - \bar{\delta} = \Delta_u(S_{meas}, {}^H\bar{p}_{ai}, {}^B\bar{p}_{bi}, \delta^H p_{ai}, \delta^B p_{bi}) \\ \Delta_d = \delta_d - \bar{\delta} = \Delta_d(S_{meas}, {}^H\bar{p}_{ai}, {}^B\bar{p}_{bi}, \delta^H p_{ai}, \delta^B p_{bi}) \end{cases} \quad \text{Equation (21)}$$

Because a single strut has 6 error variables to estimate, at least 6 independent measurements are needed. To create more measurements, the same process is repeated at a different head pose, i.e., another geometrically diverse configuration is selected, and the same up and down motion for the strut is performed.

Here, the first strut is being used as an example. To formulate the estimation problem, the error sensitivity is required. For this, the upper and lower joint positions of the first strut are denoted as $$w = \begin{bmatrix} {}^H p_{a1} \\ {}^B p_{b1} \end{bmatrix} \quad \text{Equation (22)}$$

The strut length is a function of the joint positions and the pose, i.e., $l_1 = l_1(w, \text{pose})$. By taking the partial differential of the strut length with respect to the joint positions, $$\begin{cases} H_0 \equiv \dfrac{\delta l_1(w, pose_0)}{\delta w^T} \in R^{1 \times 6} \\ H_u \equiv \dfrac{\delta l_1(w, pose_u)}{\delta w^T} \in R^{1 \times 6} \\ H_d \equiv \dfrac{\delta l_1(w, pose_d)}{\delta w^T} \in R^{1 \times 6} \end{cases} \quad \text{Equation (23)}$$

the first order expression of the strut lengths can be written as $$\begin{cases} l_{10} \approx l_1(w, pose_0) + H_0 \delta w = \bar{l}_{10} + H_0 \delta w \\ l_{1u} \approx l_1(w, pose_u) + H_u \delta w = \bar{l}_u + H_u \delta w \\ l_{1d} \approx l_1(w, pose_d) + H_d \delta w = \bar{l}_d + H_d \delta w \end{cases} \quad \text{Equation (24)}$$

where $\delta w$ is the joint position error vector. The length differentials can be formed similar to the predicted strut length differentials $$\begin{cases} \Delta l_u = (\bar{l}_{1u} - \bar{l}_{10}) + (H_u - H_0)\delta w \\ \Delta l_d = (\bar{l}_{1d} - \bar{l}_{10}) + (H_d - H_0)\delta w \end{cases} \quad \text{Equation (25)}$$

Then, the innovation of the delta struts can be related to the joint position errors as $$\begin{cases} \Delta l_u = (\bar{l}_{1u} - \bar{l}_{10}) + (H_u - H_0)\delta w \equiv \Delta H_u \delta w \\ \Delta l_d = (\bar{l}_{1d} - \bar{l}_{10}) + (H_d - H_0)\delta w \equiv \Delta H_d \delta w \end{cases} \text{or} \quad \text{Equation (26)}$$

$$\begin{bmatrix} \Delta_u \\ \Delta_d \end{bmatrix} \equiv \begin{bmatrix} \Delta l_u - (\bar{l}_{1u} - \bar{l}_{10}) \\ \Delta l_d - (\bar{l}_{1d} - \bar{l}_{10}) \end{bmatrix} \equiv \begin{bmatrix} \Delta H_u \\ \Delta H_d \end{bmatrix} \delta w \quad \text{Equation (27)}$$

For other configurations, the same deltas can be similarly formed $$\left. \begin{matrix} \begin{bmatrix} \Delta_u^1 \\ \Delta_d^1 \end{bmatrix} = \begin{bmatrix} \Delta H_u^1 \\ \Delta H_d^1 \end{bmatrix} \delta w \\ \cdots \\ \cdots \\ \begin{bmatrix} \Delta_u^n \\ \Delta_d^n \end{bmatrix} = \begin{bmatrix} \Delta H_u^n \\ \Delta H_d^n \end{bmatrix} \delta w \end{matrix} \right\} \to \Delta \equiv \begin{bmatrix} \Delta_u^1 \\ \Delta_d^1 \\ \cdots \\ \cdots \\ \Delta_u^n \\ \Delta_d^n \end{bmatrix} = \begin{bmatrix} \Delta H_u^1 \\ \Delta H_d^1 \\ \cdots \\ \cdots \\ \Delta H_u^n \\ \Delta H_d^n \end{bmatrix} \delta w \equiv H \delta w \quad \text{Equation (28)}$$

Consequently, the joint position errors can be estimated using Least-Square approach as follows:

$$\widehat{\delta w} = (H'H)^{-1} H' \Delta \quad \text{Equation (29)}$$

Hexapod Calibration Example

For purposes of explanation, a numerical example has been constructed using the following assumptions. In this example, three geometrically diverse pose configurations are used. For each configuration, a single strut is moved up by 10 mm and down by 10 mm from its nominal position while keeping the other five struts at their nominal positions. As a result, for each strut and each configuration, three sets of poses and two sets of differentials are obtained from the three sets, with a total of six sets of differentials from all three configurations. A least square problem is solved to obtain the strut joint location errors and an iterative procedure is used to refine the estimates to the satisfactory tolerance.

Configurations

In this example, the PIXL hexapod design geometric parameters with the head and base joint locations is used. To simulate the joint position errors, a set of randomly generated position errors from normal distribution with 3-sigma of 4 mm are chosen. Those randomly chosen numbers are added to CAD model joint location coordinates and the corrupted location coordinates are then used as the truth locations of the joints. The CAD model joint locations are used as the initial estimate the truth joint locations.

Next, the three pose configurations for calibration are selected as follows. A 1-2-3 Euler angle sequence is used to define the pose. The three sets of Euler angles are as follows:

TABLE 1

Euler Angles for Simulation Case Configurations

|  | CONFIG 1 (DEGREE) | CONFIG 2 (DEGREE) | CONFIG 3 (DEGREE) |
|---|---|---|---|
| ROLL | 0 | 5 | 0 |
| PITCH | −5 | −5 | 0 |
| YAW | −5 | 0 | 5 |

The origin displacement is chosen as the nominal home position length defined by the mechanical design of the PIXL hexapod system.

Emulation of Truth Strut Lengths

The nominal truth strut lengths for each pose configuration are computed from the truth hexapod model using the truth joint locations and the truth pose by solving an inverse kinematics problem:

$$l_i = f(H_{a_i}, B_{b_i}, \text{pose}_{truth}) \quad \text{Equation (30)}$$

where i=1, 2, . . . , 6.

where the truth pose is computed from the 123 Euler angle sequence and the origin displacement.

$$\begin{cases} {}^B r_{B \to H} = [0 \ 0 \ 0]^T \\ C_{HB} = dcm(3, \text{yaw})dcm(2, \text{pitch})dcm(1, \text{roll}) \\ C_{BH} = C_{HB}' \end{cases} \quad \text{Equation (31)}$$

For each configuration, once the truth strut lengths are computed, the two sets of the delta truth strut lengths are easily obtained by adding or subtracting a fixed length from the nominal strut length.

Emulation of Predicted Strut Lengths

To obtain the predicted strut lengths for the simulation purpose, we make use of the initial estimate of the joint locations and the emulated pose measurements.

The emulated pose measurements are based on the assumed truth pose (determined by the Euler angles and the origin displacement) corrupted by the assumed survey measurement equipment accuracy. Note that there are three different poses that need to be computed for the predicted delta strut lengths: the nominal, the up case, and the down case. The nominal pose information is already available from the assumed Euler angle sequence and origin displacement. However, for the poses with a single strut up and down from the nominal pose configuration, the characterization of the up and down poses requires additional steps, described as follows.

First, the proposed strut "up" delta is added to the truth strut length that was computed earlier. Next, using the truth joint locations and the previously computed truth strut lengths at the "up" pose, the truth pose is calculated by solving a forward kinematics problem. After that, the "down" pose case is similarly treated. Once the truth poses information for the "up" and "down" poses are obtained, and the measurement error is added, the predicted strut lengths at those poses are computed, the predicted joint locations and the emulated measured poses, obtained from the already computed truth poses with assumed measurement uncertainties.

Measurement Matrix

The strut length sensitivity matrix relative to joint locations is fairly complex, but its formula is obtained using symbolic computation software and used in the simulation.

Recursive Estimation Process

The actual estimation can be iteratively improved starting with the initial estimates of the joint locations, including the following process for any of the 6 struts.

First, a trust model of poses and strut lengths are computed for the minimal "up" and "down" cases for all three configurations.

Next, the two measured strut length differentials are computed for each configuration for a total of 6 sets of measured length differentials. After that, the two predicted strut length differentials for each configuration are computed using the measured poses and predicted strut joint locations. Next, the two sensitivity matrix differentials for each configuration are computed using the predicted pose and predicted strut joint locations for the nominal, "up" and "down" cases, and then, stack up all the equations from the possible configurations. From this, a Least Square problem can be formulated. Finally, the current strut joint locations are updated using the estimated joint location errors.

This process may be repeated for a pre-determined total iteration number.

FIG. 4 is a flow diagram illustrating a process 400 for executing calibration of a hexapod structure, according to an embodiment of the present invention. In some embodiments, process 400 begins at 402 with measuring a head pose of the hexapod structure relative to a base of the hexapod structure. At 404, for each strut, a length of each strut is independently increased by a predefined amount from an original length and repeating the measuring of the head pose relative to the base. At 406, for each strut, a length of each strut is independently decreased by a predefined amount from the original length and repeating the measuring of the head pose relative to the base. At 408, each strut is moved back to the original length, and at 410, joint errors for each strut are initiated with the best knowledge prior to calibrating of the hexapod structure and estimated using the calibration algorithm.

The process shown in FIG. 4 may be performed, in part, by a computer program, encoding instructions for a nonlinear adaptive processor to cause at least the process described in FIG. 4 to be performed by the apparatuses discussed herein. The computer program may be embodied on a non-transitory computer readable medium. The computer readable medium may be, but is not limited to, a hard disk drive, a flash device, a random access memory, a tape, or any other such medium used to store data. The computer program may include encoded instructions for controlling the nonlinear adaptive processor to implement the process described in FIG. 4, which may also be stored on the computer readable medium.

The computer program can be implemented in hardware, software, or a hybrid implementation. The computer program can be composed of modules that are in operative communication with one another, and which are designed to pass information or instructions to display. The computer program can be configured to operate on a general purpose computer, or an application specific integrated circuit ("ASIC").

It will be readily understood that the components of various embodiments of the present invention, as generally described and illustrated in the figures herein, may be arranged and designed in a wide variety of different configurations. Thus, the detailed description of the embodiments, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A process for calibrating a hexapod structure, comprising:
    measuring a head pose of the hexapod structure relative to a base of the hexapod structure;
    for each strut, independently increasing a length of each strut by a predefined amount from an original length and repeating the measuring of the head pose relative to the base;
    for each strut, independently decreasing a length of each strut by a predefined amount from the original length and repeating the measuring of the head pose relative to the base;
    moving each strut back to the original length; and
    estimating joint errors for each strut prior to calibrating of the hexapod structure.

2. The process of claim 1, wherein the estimating of the joint errors comprises
    estimating upper joint location errors and lower joint location errors for each strut using a difference between a predicted pose and a measured pose.

3. The process of claim 2, wherein the estimating of the upper joint location errors and lower joint location errors comprises
    predicting an upper joint location in a base frame using initial estimates of the head joint location coupled with a measured pose.

4. The process of claim 3, wherein the estimating of the upper joint location errors and lower joint location errors comprises
    with the predicted upper joint location in the base frame, computing predicted strut lengths from upper joint position and lower joint position in a base frame.

5. The process of claim 4, wherein the estimating of the joint errors further comprises
    when a measured strut length is available, estimating the joint error by using a difference between the measured strut length and the predicted strut lengths.

6. The process of claim 4, wherein the estimating of the joint errors further comprises
    when a measured strut length is not available, estimating the joint error by using strut length differentials.

7. A computer program embodied on a non-transitory computer readable medium, the computer program is configured to cause at least one processor to execute:
    measuring a head pose of the hexapod structure relative to a base of the hexapod structure;
    for each strut, independently increasing a length of each strut by a predefined amount from an original length and repeating the measuring of the head pose relative to the base;
    for each strut, independently decreasing a length of each strut by a predefined amount from the original length and repeating the measuring of the head pose relative to the base;
    moving each strut back to the original length; and
    estimating joint errors for each strut prior to calibrating of the hexapod structure.

8. The computer program of claim 7, wherein the computer program is further configured to cause at least one processor to execute:
    estimating upper joint location errors and lower joint location errors for each strut using a difference between a predicted pose and a measured pose.

9. The computer program of claim 8, wherein for the estimating of the upper joint location errors and lower joint location errors, the computer program is further configured to cause at least one processor to execute:
    predicting an upper joint location in a base frame using initial estimates of the head joint location coupled with a measured pose.

10. The computer program of claim 9, wherein for the estimating of the upper joint location errors and lower joint location errors, the computer program is further configured to cause at least one processor to execute:
    with the predicted upper joint location in the base frame, computing predicted strut lengths from upper joint position and lower joint position in a base frame.

11. The computer program of claim 10, wherein for the estimating of the joint errors, the computer program is further configured to cause at least one processor to execute:
    when a measured strut length is available, estimating the joint error by using a difference between the measured strut length and the predicted strut lengths.

12. The computer program of claim 11, wherein for the estimating of the joint errors, the computer program is further configured to cause at least one processor to execute:

when a measured strut length is not available, estimating the joint error by using strut length differentials.

13. An apparatus, comprising:
memory comprising a set of instructions; and
at least one processor, wherein
the set of instructions with the at least one processor is configured to cause the apparatus to execute:
measuring a head pose of the hexapod structure relative to a base of the hexapod structure;
for each strut, independently increasing a length of each strut by a predefined amount from an original length and repeating the measuring of the head pose relative to the base;
for each strut, independently decreasing a length of each strut by a predefined amount from the original length and repeating the measuring of the head pose relative to the base;
moving each strut back to the original length; and
estimating joint errors for each strut without influence of errors associated with other struts prior to calibrating of the hexapod structure.

14. The apparatus of claim 13, wherein the set of instructions with the at least one processor is further configured to cause the apparatus to execute:
estimating upper joint location errors and lower joint location errors for each strut using a difference between a predicted pose and a measured pose.

15. The apparatus of claim 14, wherein for the estimating of the upper joint location errors and lower joint location errors, the set of instructions with the at least one processor is further configured to cause the apparatus to execute:
predicting an upper joint location in a base frame using initial estimates of the head joint location coupled with a measured pose.

16. The apparatus of claim 15, wherein for the estimating of the upper joint location errors and lower joint location errors, the set of instructions with the at least one processor is further configured to cause the apparatus to execute:
with the predicted upper joint location in the base frame, computing predicted strut lengths from upper joint position and lower joint position in a base frame.

17. The apparatus of claim 16, wherein for the estimating of the joint errors, the set of instructions with the at least one processor is further configured to cause the apparatus to execute:
when a measured strut length is available, estimating the joint error by using a difference between the measured strut length and the predicted strut lengths.

18. The apparatus of claim 17, wherein for the estimating of the joint errors, the set of instructions with the at least one processor is further configured to cause the apparatus to execute:
when a measured strut length is not available, estimating the joint error by using strut length differentials.

19. The apparatus of claim 18, wherein for the estimating of the joint errors by using the strut length differentials, the set of instructions with the at least one processor is further configured to cause the apparatus to execute:
moving the strut from its nominal position to a position further up and to a position further down, allowing for three strut positions or poses; or
measuring three poses of each strut such that lengths of each strut are computed as a function of the three poses, and forming two length differences for each strut.

20. The apparatus of claim 18, wherein for the estimating of the joint errors by using the strut length differentials, the set of instructions with the at least one processor is further configured to cause the apparatus to execute:
measuring one or more N number of poses of each strut with N number of lengths of each strut, where N is greater than 3; and
forming N−1 number of length differences for each strut.

* * * * *